United States Patent
Davari et al.

(10) Patent No.: US 7,068,602 B2
(45) Date of Patent: Jun. 27, 2006

(54) FEEDBACK PRIORITY MODULATION RATE CONTROLLER

(75) Inventors: Shahram Davari, Kanata (CA); Heng Liao, Burnaby (CA); Stacy William Nichols, Kanata (CA)

(73) Assignee: PMC-Sierra Ltd., Burnaby (CA)

( * ) Notice: Subject to any disclaimer, the term of this patent is extended or adjusted under 35 U.S.C. 154(b) by 928 days.

(21) Appl. No.: 10/058,776

(22) Filed: Jan. 30, 2002

(65) Prior Publication Data

US 2002/0141379 A1    Oct. 3, 2002

Related U.S. Application Data

(60) Provisional application No. 60/265,105, filed on Jan. 31, 2001.

(51) Int. Cl.
*G01R 31/08* (2006.01)
(52) U.S. Cl. .................................................. 370/232
(58) Field of Classification Search .................... None
See application file for complete search history.

(56) References Cited

U.S. PATENT DOCUMENTS

| 6,003,062 A * | 12/1999 | Greenberg et al. ........... 718/104 |
| 6,445,707 B1 * | 9/2002 | Iuoras et al. ............ 370/395.43 |
| 2002/0122428 A1 * | 9/2002 | Fan et al. ................. 370/395.4 |
| 2003/0058802 A1 * | 3/2003 | Jones et al. .................. 370/252 |

* cited by examiner

*Primary Examiner*—Duc Ho
(74) *Attorney, Agent, or Firm*—Curtis B. Behmann; Borden Ladner Gervais LLP

(57) ABSTRACT

Methods and devices for controlling and managing data flow and data transmission rates. A feedback mechanism is used in conjunction with measuring output transmission rates to control the input transmission rates, changing conditions can be accounted for an excess output transmission capacity can be shared among numerous input ports. Similarly, by using maximum and minimum rates which can be requested from an output port, minimum transmission rates can be guaranteed for high priority traffic while capping maximum output rates for low priority traffic. By combining the two ideas of feedback rate control and placing maximum requestable transmission rates, a more equitable output sharing mechanism arises. The measured output transmission rate is used to control and recalculate the maximum requestable output transmission rate for incoming flows, thereby allowing for changing network and data flow conditions.

17 Claims, 7 Drawing Sheets

FEEDBACK PRIORITY MODULATION RATE CONTROLLER

This application relates to U.S. Provisional Patent Application 60/265,105 filed Jan. 31, 2001.

FIELD OF INVENTION

This invention relates to flow control and resource allocation and, more specifically, to networking technologies for managing data flow and data flow rates in network switching devices.

BACKGROUND OF THE INVENTION

The world of computer and communications networking is continually evolving. More efficient and more effective devices and methods are being developed to overcome the bottlenecks in the network datapath.

One of the bottlenecks is the problem of oversubscription of resources in a network switch. Currently, network switches are implemented using line cards with multiple ingress (input) and multiple egress (output) lines. Merging data flows from ingress lines to the egress lines requires complex and sophisticated solutions to provide adequate service to the different data flows passing through the ingress lines. A challenge to the egress data flow merging problem is that some flows passing through the ingress/egress line card have minimum transmission requirements. As such, this traffic must be guaranteed a minimum amount of resources (e.g. transmission capacity and number of cells or DTUs required to transport the traffic).

There are currently a few solutions to this question of sharing line capacity between multiple ingress lines. The first solution is that of using a switch fabric with an overspeed factor of N (ideal output queuing switch), in which N is the number of input line cards. These switches have no input buffer and therefore the switch fabric is not a bottleneck for these switches. However, a speedup of N is not feasible for high capacity switches.

A second solution is that of using simple high-speed switches with a small speed up and using virtual output queues in the ingress line cards. These high-speed switch fabrics are intentionally simple and leave most of the work to the Traffic Management chips. Typically, the switch fabrics uses certain forms of arbiters to resolve the conflict between the simultaneous requests for a destination port from multiple source ports. Due to the high speed of such switches, typical arbiter implementations provide relatively simple scheduling algorithms such as a hierarchy of strict priority among the classes and round robin among the ingress ports without awareness of the QOS provisioning of each line card. Consequently, the bandwidth distribution among the source ports are dictated by the characteristics, rather than by the service requirements of each individual line cards. When the switch experiences traffic oversubscription, the scheduling discipline of the switch arbiter will make the local traffic scheduling on the line card ineffective because the switch itself is the congestion point in the system.

A third solution involves using a central scheduler. Some switch fabrics use a central scheduler that holds all the rate information of the egress line cards, and therefore could precisely distribute the egress bandwidth fairly between ingress line cards. Due to their complexity these switches are not scalable and therefore cannot used in high speed and high port switches/routers. The central scheduler needs to maintain a global state information database for all traffic flows in the system. In a typical switch system with N ports, such state information is in the order of N×N. Because of the $N^2$ context overhead such a solution is not scalable.

A fourth solution involves managing the grant/request system between the ingress and the egress. Essentially, the ingress requests resources from the egress to allow the incoming data through the ingress line to exit through the egress line. When required, the egress then grants these requests and allows data to pass from the ingress to the egress. Some virtual output queuing switches implement per class request grant protocols. The Request messages are generated separately for each input queue and the egress port has a distributed scheduler that is responsible for scheduling the requests for that particular port. Grant messages are generated and sent back by the fabric to the ingress line card, which then transmits a packet according to the input queue identifier in the Grant message. This mechanism requires the switch fabric to have sufficient overspeed, dedicated channel or efficient support for variable size Request/Grant/Data messages. It also requires the egress port to implement a per input class scheduler. The overall cost and complexity of such switch fabric is high. There is no known mechanism for scaling such switch fabric to Tera-bit speed.

Unfortunately, none of the above solutions provide the flexibility required with a minimum of hardware/software. An ideal solution should provide to each port/class output pair in a line card its assigned committed rate. Also, the solution should also be able to share extra transmission capacity (or bandwidth) between all line cards trough some weighting/sharing factor. The solution should require minimal hardware and must only consume a small fraction of a switch fabric's resources. Any virtual output queuing switches must be supported and the solution should be designed to work on slow-changing traffic.

It should be noted that the term data transmission unit (DTU) will be used in a generic sense throughout this document to mean units through which digital data is transmitted from one point in a network to another. Thus, such units may take the form of packets, cells, frames, or any other unit as long as digital data is encapsulated within the unit. Thus, the term DTU is applicable to any and all packets and frames that implement specific protocols, standards or transmission schemes. It should also be noted that the term digital data will be used throughout this document to encompass all manner of voice, multimedia content, video, binary data or any other form of data or information that has been digitized and that is transmitted from one point in a network to another as a payload of a data transmission unit.

For this document, the term "rate" is defined to mean amount of data transmitted per unit time. Thus, any references to "transmission rate" is defined as how much data is transferred or transmitted for a given amount of time. "Rate" is not to be taken to mean the speed or velocity at which data travels through a transmission medium.

SUMMARY OF THE INVENTION

The present invention provides methods and devices for controlling and managing data flow and data transmission rates. A feedback mechanism is used in conjunction with measuring output transmission rates to control the input transmission rates, changing conditions can be accounted for an excess output transmission capacity can be shared among numerous input ports. Similarly, by using maximum and minimum rates which can be requested from an output port, minimum transmission rates can be guaranteed for high priority traffic while capping maximum output rates for low priority traffic. By combining the two ideas of feedback rate control and placing maximum requestable transmission rates, a more equitable output sharing mechanism arises. The measured output transmission rate is used to control and recalculate the maximum requestable output transmission rate for incoming flows, thereby allowing for changing network and data flow conditions.

In a first aspect the present invention provides a method of controlling how many data transmission units (DTUs) are processed by a device, the device processing both high priority DTUs and low priority DTUs, the method comprising:
 a) establishing a desired minimum number of DTUs processed in a given time interval (MCR);
 b) establishing a desired maximum number of DTUs processed in the given time interval (PCR);
 c) for high priority DTUs, requesting a maximum of MCR DTUs for processing for every specific interval of time;
 d) for low priority DTUs, requesting a maximum of (PCR−MCR) DTUs for processing for every specific interval of time;
 e) determining at an output stage of the device a number of DTUs output by the device in a given amount of time;
 f) transmitting the number determined in step e) to an input stage of the device; and
 g) changing a value of PCR based on the number determined in step e).

In a second aspect the present invention provides a device for routing data transmission units (DTUs) from a source to a destination comprising:
 at least one input port for receiving incoming DTUs from the source;
 at least one output port for transmitting DTUs to the destination;
 a switch fabric for switching transmitting DTUs from one of the at least one input port to one of the at least one output port;
 a controller for controlling an input rate of the input port and for controlling an output rate of the output port;
 measurement means for measuring the output rate of the output port, the measurement means transmitting the output rate to the controller, wherein
 the controller adjusts the input rate based on the output rate.

In a third aspect the present invention provides a method of allocating resource units between high priority tasks and low priority tasks, the method comprising:
 a) establishing a desired minimum number of resource units (x) to be allocated to a task;
 b) establishing a desired maximum number of resource units (y) to be allocated to a task;
 c) establishing a first upper limit to resource units to be requested for high priority tasks, the first upper limit being equal to the desired minimum number of resource units (x); and
 d) establishing a second upper limit to resource units to be requested for low priority tasks, the second upper limit being equal to the desired maximum number of resource units (y).

In a fourth aspect the present invention provides a method of controlling a rate of input data flow into a device, the method comprising:
 a) measuring a rate of output data flow from the device at an output section of the device;
 b) transmitting the rate of output data flow from the output section to at least one input section; and c) adjusting a rate of input data flow at the or each input section based on the rate of output data flow.

BRIEF DESCRIPTION OF THE DRAWINGS

A better understanding of the invention may be obtained by reading the detailed description of the invention below, in conjunction with the following drawings, in which.

DETAILED DESCRIPTION

The solution presented, a feedback priority modulation rate controller, will have two main components: a feedback rate controller and a priority modulation section. Each of these will be discussed in turn.

Feedback Rate Controller

Figure 1:
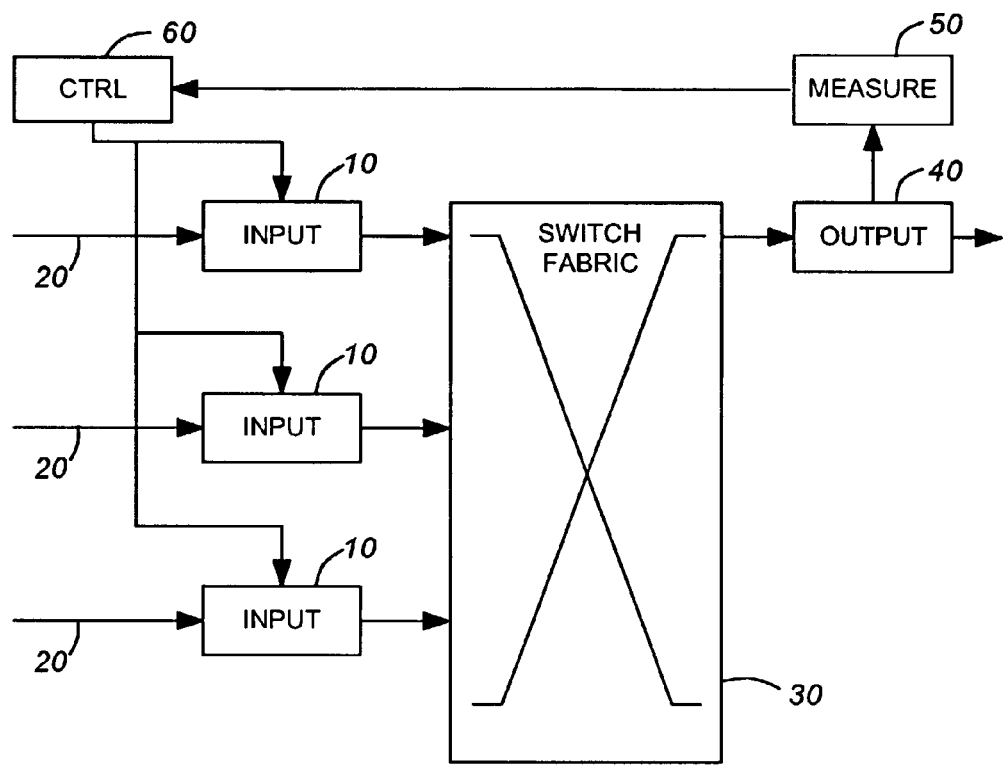
FIG. 1 is a block diagram illustrating the concept behind the feedback rate controller.

The basic concept behind the feedback rate controller is illustrated in FIG. 1. A number of inputs 10 receive and forward data traffic from different data flows 20 into a switch fabric 30. The switch fabric 30 routes the data traffic to an output port 40 that transmits the data traffic to its next destination. The amount of data traffic that passes through the output port 40 is measured by a measuring device 50 at fixed intervals. This data traffic rate (amount of data traffic passing through the output port during a given time interval) is then transmitted to a controller 60. Based on this data traffic rate, the controller 60 adjusts the amount of data traffic forwarded by the inputs 10 to the switch fabric 30.

In conventional systems, the data traffic transiting through the input/output ports of a line card (also normally termed as the ingress/egress ports) is encapsulated in fixed sized data transmission units (DTUs). In most cases, these DTUs take the form of cells. However, throughout this document, such encapsulation will be referred to as data transmission units.

The system illustrated in FIG. 1 controls the amount of data traffic transiting from the input port to the output port by controlling the number of DTUs passing through a given input port in a given amount of time. Thus, as an example, if the data traffic passing through the output port 40 is 100 DTUs every 10 ns, this transmission rate causes a corresponding action to occur at the input port. Each measured output transmission rate has a corresponding input transmission rate.

It should be noted that while FIG. 1 illustrates a single output port 40, the principles above can be applied to multiple parallel output ports being shared by multiple input ports.

Figure 1A:
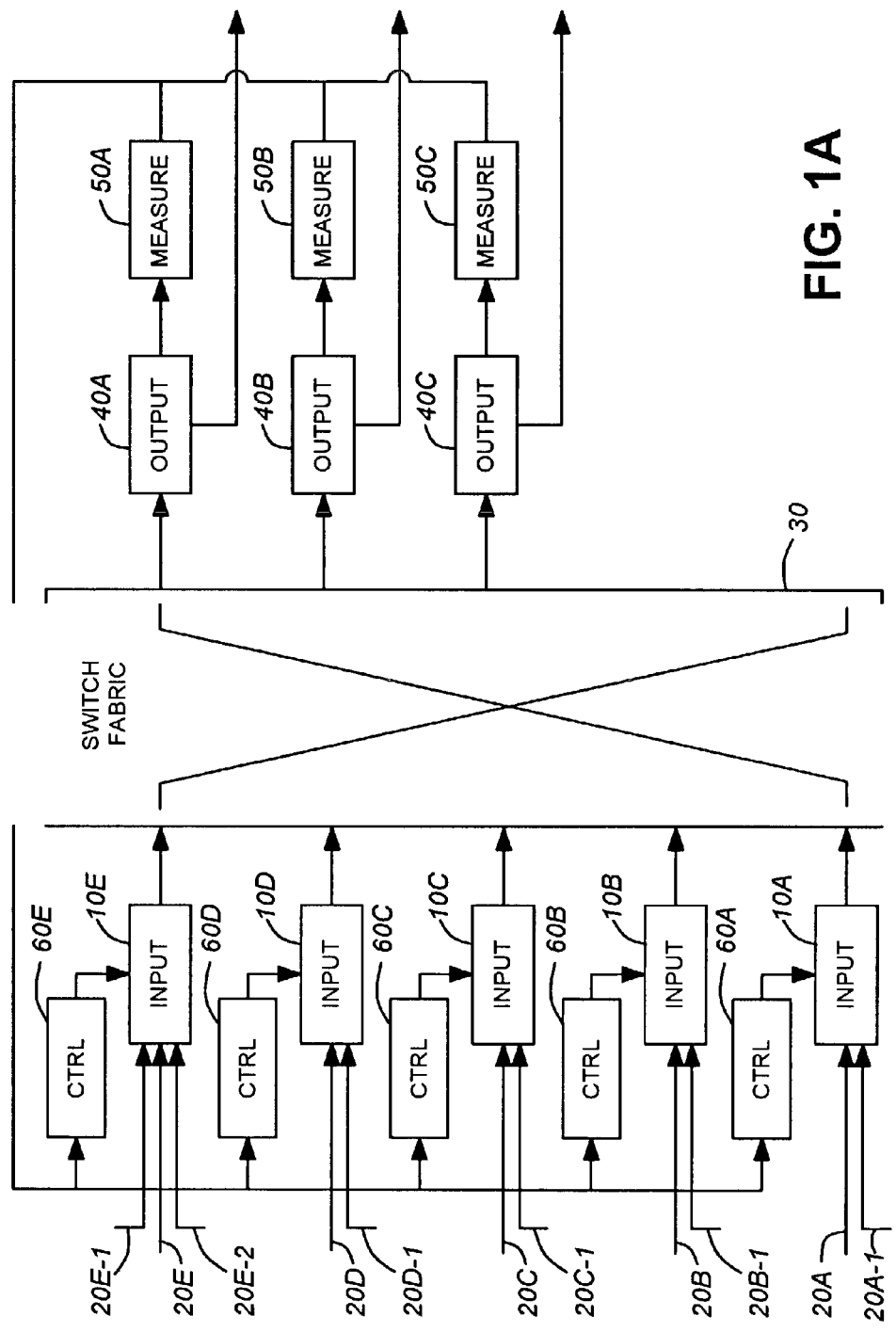
FIG. 1A is a block diagram illustrating a system similar to that illustrated in FIG. 1 but with multiple output ports and multiple controllers.

Such a system is illustrated in FIG. 1A. As can be in FIG. 1A, multiple output ports 40A, 40B, 40C are shared by input ports 10A, 10B, 10C, 10D and 10E. Each input port 10A–10E is provided with a dedicated controller 60A, 60B, 60C, 60D AND 60E. Each controller is fed information regarding a measured output transmission rate from the measurement devices 50A, 50B, 50C. Each input port 10A–10E has a different data flow 20A, 20B, 20C, 20D, 20E. The switch fabric 30 routes data flow from one input port to one of the output ports in a well known manner. It should be noted that multiple data flows can enter an input port. As shown in FIG. 1A, input port 10E receive multiple data flows with input port 10A receiving data flows 20A and 20A-1 input port 10B receiving data flows 20B and 20B-1, and so on. While the controllers 60A–60E are each dedicated to a single input port, each of these controllers separately manage the input rate of the separate data flows being received by their corresponding input port. As such, controller 60E manages the input rate of data flows 20E, 20E-1, and 20E-2 separately. Thus, data flow 20E may have an input rate separate and independent from the input rate of data flows 20E-1 and 20E-2. Equally, controller 60A manages the input rate of data flow 20A separately from the input rate of data flow 20A-1. To reiterate, data input rate is controlled on a per data flow basis and not on a per input port basis.

The system illustrated in FIG. 1A can implement virtual output queueing. With virtual output queueing each input port can have N virtual output queues corresponding to the N possible output ports. Each queue is separately managed by at least one rate controller or each of the queues for an input port is managed separately by a single rate controller. Essentially, if an input port has N queues, then the rate controller dedicated to that input port must manage each of those queues separately. Alternatively, for an input port with N virtual output queues corresponding to N possible output ports the input port can have N rate controllers. While FIG. 1A illustrates a single rate controller per input port, each controller block 60A–60E can represent either a single rate controller that manages multiple queue simultaneously, or it can represent multiple rate controllers per controller block with each rate controller managing a separate data flow. It should also be noted that the multiple data flows entering an input port is usually multiplexed onto a single input line into the input port.

For further clarification, it should be clear that any one of the data flows being received by the input ports can be routed to any one of the output ports. Thus, data flow 20E-1 can be routed to any one of output ports 40A, 40B, 40C. Similarly, data flow 20D can be routed to any of the output ports 40A, 40B, 40C.

To improve fair sharing between the multiple input ports 10 and between the different data flows 20A–20F, a sharing factor can be included in the system.

The sharing factor is a weight by which the data traffic rate measured at the output port 40 is multiplied. The value resulting from this multiplication can then be added to a fixed transmission rate for a specific one of the input ports 10. The final value from this calculation determines the resulting transmission rate for the specific input port. The formula is as follows:

Resulting input transmission rate=(measured output transmission rate)×sharing factor+fixed transmission rate.

Thus, an increase in the measured output transmission rate results in an increased resulting input transmission rate for the input port.

By using such a system, regardless of the output transmission rate measured at the output port, each input port is guaranteed a minimum input transmission rate equal to the fixed transmission rate represented in the equation above. This fixed transmission rate may be different for each different input port. The effect of the measured output transmission rate on the resulting input transmission rare is controlled by the sharing factor. As such, if a system designer did not want a specific input port to be too susceptible to changes in the measured output transmission rate, then the system designer merely has to use a small value for that input port's sharing factor. Conversely, if the system designer wanted an input port that closely followed the changes in the transmission capacities of the output port, then for that input port, the sharing factor would have a large value.

The system illustrated in FIG. 1 controls the resulting input transmission rate by sending control signals from the controller 60 to each of the input ports 10. Each control signal determines the input transmission rate for a particular input port and each control signal is determined by the calculation and the factors outlined above.

To assist in the management of the system in FIG. 1, the output transmission rate is only measured at specific time intervals. Because of this, any changes to the input transmission rates are only implemented at discrete instances-the controller 60 only sends control signals to the input ports at specific times.

The above concepts can be applied to multiple output ports by having each output port contribute to an input port's overall resulting input transmission rate. This can be expressed mathematically for n output ports as:

$$RTR_j = \left[\sum_{i=0}^{n}(SH_i \times MOTR_i)\right] + FTR_j$$

where
  $RTR_j$=resulting transmission rate for input port j;
  $SH_i$=sharing factor for output port i
  $MOTR_i$=measured output transmission rate for output port i
  $FTR_j$=fixed transmission rate for input port As can be seen, each input port can have a different fixed transmission rate (the minimum guaranteed rate for the input port) and a different sharing factor for different output ports. It should be noted that while the equation notes a contribution from each output port, by controlling the sharing factor (e.g. setting a specific sharing factor to 0), the contribution from any output port can be minimized or even eliminated.

What the system outlined above essentially implements is a method of sharing excess output transmission capacity among multiple input ports or among multiple data flows. Each input port is guaranteed a minimum input transmission rate and any excess input transmission capacity is controlled by the sharing factors(s). The higher a sharing factor is for a specific input/output port pair, the greater excess transmission capacity is allocated to the input port.

To prevent the system from being overburdened, the utilized transmission capacity of the output port 40 is ideally kept at a specified value or to within a specified range. The utilized transmission capacity of an output port is simply how much of the transmission capacity of the output port is actively utilized. As an example, if the output port is capable of transmitting 100 DTUs/ms and the output port is only transmitting 60 DTUs/ms, then the utilized transmission capacity is 60%. This means that the output transmission rate of this output port can, if desired, be increased by an extra 40 DTUs/ms. Ideally, to maximize the output port usage, the utilized transmission capacity is targeted at close to 99%. To control this utilized transmission capacity for an output port, the controller 60 may adjust the measured output transmission rate for that output port. To increase the utilized transmission capacity, the controller 60 may increase the measured output transmission rate that is used in calculating an input port's resulting transmission rate. Conversely, to reduce the utilized transmission capacity for an output port, the controller 60 may reduce the measured output transmission rate for an output port prior to calculating an input port's resulting transmission rate.

The system in FIG. 1 and its control method as can be seen as a steady state system when the input transmission rates and the output transmission rates are substantially fixed or when no perturbations are introduced. When perturbations or disturbances are introduced into the steady state system, such as an increased load due to the switch fabric or due to a new input port, the controller can dynamically manipulate the measured output transmission rate to control the input transmission rates of the input ports and the output transmission rates of the output ports. By manipulating this variable, the controller can stabilize the system to reach a new steady state of equilibrium that takes into account the introduced perturbation or disturbance.

Ideally, the system in FIG. 1 will have a number of features which will help in both efficiency and implementation. If the switch core is provided with a small speedup factor (e.g 1.05) this will assist in tolerating temporary oversubscription of resources during transitional states. Also, aiming for a utilized transmission capacity of about 99% for an output port ensures high port utilization while keeping the output port DTU queue depth low. If a 100% utilized transmission capacity is aimed for, an infinite DTU queue depth is required to avoid dropping DTUs. Finally, measuring the output transmission rate and adjusting the input transmission rates based on these measurements are ideally conducted at discrete, fixed time intervals and should only be accomplished in a given fixed time window.

The sharing factor for each of the input ports can be iteratively calculated based on how much of the transmission capacity of an output port is being used. This can easily be found by determining the full output transmission capacity of an output port and how much of this is being used. As noted above, if an output port is capable of transmitting 100 DTUs/ms but is only transmitting 30 DTUs/ms, then the utilized transmission capacity is 60%. The sharing factor can be calculated for each discrete time interval using the iteratively executing the following pseudo-code:

Error=(Actual Utilized Transmission Capacity −Desired Utilized Transmission Capacity)
$1_{13}$ Error−I_Error+Error
D_Error=Error _Last_Error
Last_Error=Error $$SharingFactor = Kp * \left(Error + \left(\frac{1}{Ti}\right) * I\_Error + *D\_Error\right)$$

where
Kp=proportional gain factor
Ti=integral time factor
Td=differential time factor As can be seen, in this scenario the sharing factor is dependent on how different the actual utilized transmission capacity is from the desired utilized transmission capacity. The Kp, Ti, and Td factors correspond, respectively, to the proportional, integral, and derivative components of the error. The parameters can be adjusted according to application requriements with regard to stability and transient performance of the system.

It should be noted, however, that other control functions can be sued to determine the sharing factor from the utilized transmission capacity.

Figure 2:
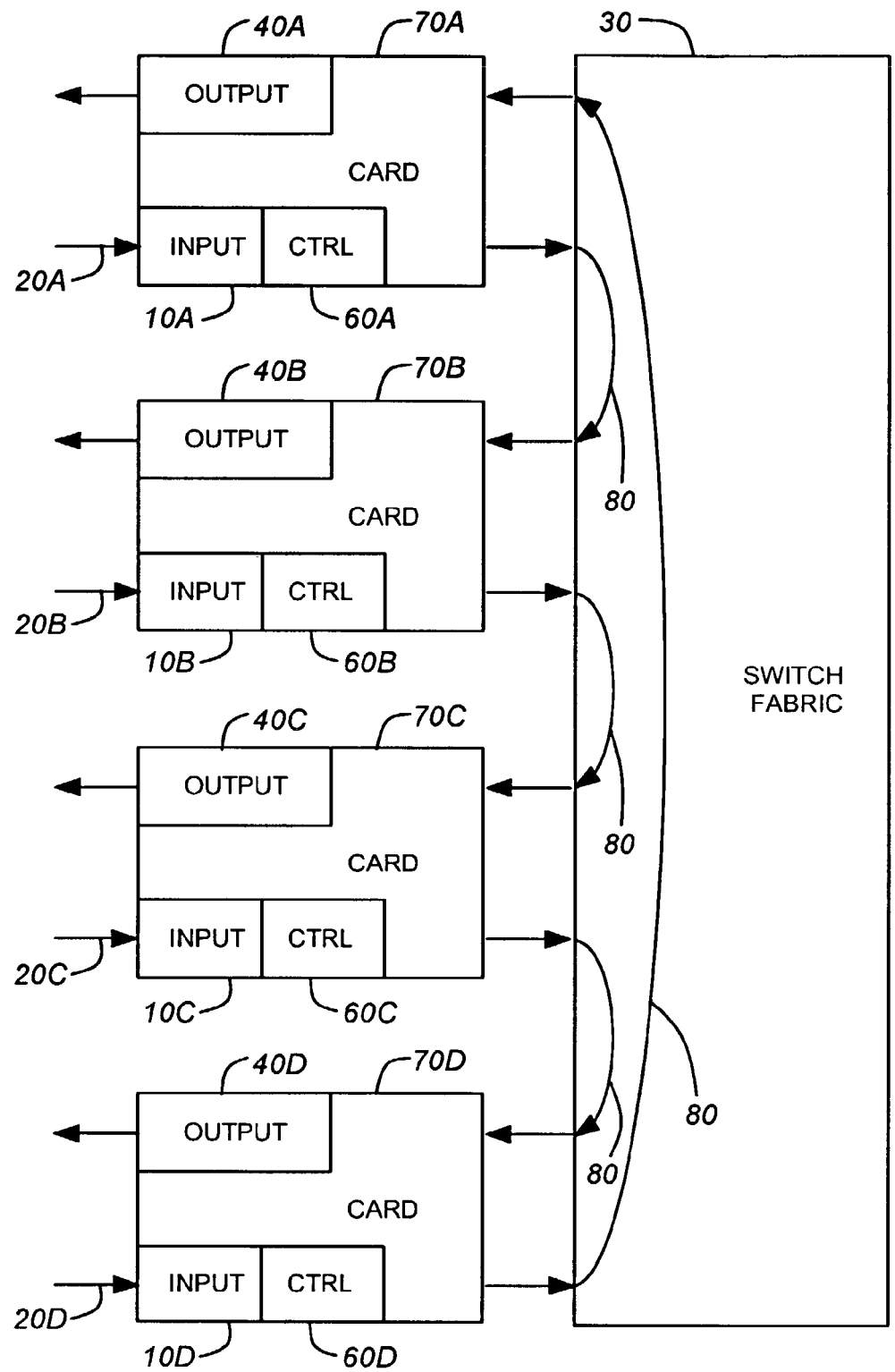
FIG. 2 is a block diagram illustrating an implementation of a path-based multicast of a token distributing the different output transmission rates for a multiple line card system.

In terms of implementing the system of FIG. 1 for multiple output ports, a path-based multicast of a token containing the different output transmission rates can be used. For such an implementation, multiple controllers, each dedicated to a single output port, is envisioned (see FIG. 2). As can be seen in FIG. 2, each line card 70A, 70B, 70C, 70D is equipped with an input port 40A, 40B, 40C, 40D respectively a controller 60A, 60B, 60C, 60D controlling a corresponding input port, and an output port 40A, 40B, 40C, 40D. In this implementation, each line card 70A, 70B, 70C, 70D is equipped with the capability of measuring the output transmission rate for its corresponding output port. The switch fabric 30 is capable of switching any of the input ports to any of the output ports.

To implement the above-mentioned path based multicast of a token, a token is generated and is passed sequentially to each line card. Arrows 80 in FIG. 2 illustrate the path that the token would take as it is sequentially passed from line card to line card. As the token passes through a line card, the line card inserts-in a specific section of the token the output transmission rate for that line card's output port. Simultaneous to this, the controller on the line card can read the output transmission rate of the other line cards and can use this data to adjust/control the input transmission rate for its own input port.

Figure 3:
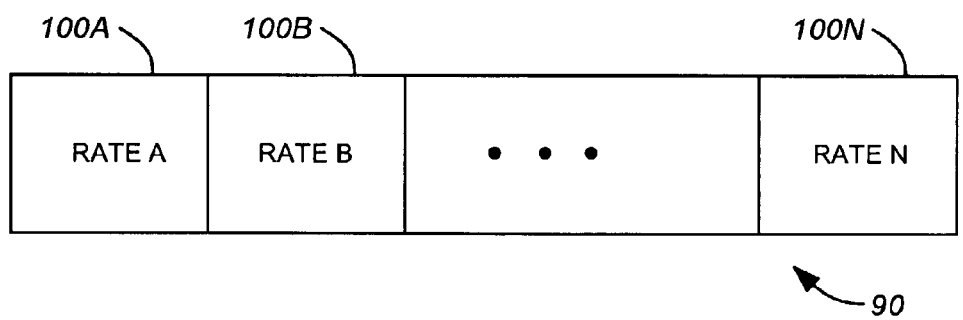
FIG. 3 is a block diagram of a possible format for a token which may be used for the system illustrated in FIG. 2.

FIG. 3 illustrates one possible implementation of the token. The token 90 is divided into sections 100A, 100B ... 100N, each of which can contain a measured output transmission rate for a specific output port. Thus, RATE A can correspond to the output transmission rate of output port 40A, RATE B can correspond to the output transmission rate for output port 40B and so on.

To ensure that the token is delivered in a timely manner, the token may be passed from line card to line card using the highest priority queue/protocol. As such, the token will be accorded the highest priority traffic status and will therefore be guaranteed to be passed to the next line card.

Priority Modulation

The priority modulation section allows high priority traffic to be guaranteed its minimum guaranteed output transmission rate while, at the same time, allowing low priority traffic access to extra transmission capacity. The priority modulation section works mostly on system which use the request/grant protocol. In this protocol, input ports request transmission capacity from an output port and, based on the granting method, the output port may grant the request or a portion thereof. As an example, an input port may request an output transmission rate of 55 DTUs/ms from an output port capable of transmitting at 100 DTUs/ms. The output port may then grant the requesting input port a rate of 30 DTUs/ms for that specific input port's traffic. Thus, the traffic from that input port would be able to exit the system through the output port at an output transmission rate of 30 DTUs/ms. The other 70 DTUs/ms transmission capacity of the output port can further be allocated to other input ports. The same grant/request protocol is also used in allocating transmission capacity to different classes of data traffic transmitting through a line card.

The priority modulation section operates by placing a cap on the maximum transmission rate that may be requested from an output port by a particular input port or class of data flow. A maximum requestable transmission rate is imposed on both high priority traffic and low priority traffic. These two priority classes are used as they comprise the switch priority classes. If MCR is defined as the minimum cell rate or minimum transmission rate that a specific input port or service class requires and if PCR is defined as the peak cell rate or maximum transmission rate for an output port, then these two values can be used as maximums for output transmission capacities requested by an input port.

The MCR is used as the maximum output transmission capacity that input port/class can request for high priority traffic. Similarly, (PCR−MCR) is used as the maximum output transmission capacity that an input port/class can request for low priority traffic. Thus, the sum total of all transmission rates requested by an input port for high priority traffic cannot exceed MCR. Equally, the sum total of all transmission rates requested by an input port for low priority traffic cannot exceed (PCR−MCR). By providing such caps on the transmission rates that can be requested, the priority modulation section guarantees high priority traffic its minimum required transmission rate (MCR) while capping the maximum rate (PCR) that can be requested and granted for low priority traffic. Thus, if a data flow/input port has high priority traffic that requires a rate of 30 DTUs/ms and MCR is set at 40 DTUs/ms then the input port can request this rate for its high priority traffic. Similarly, if MCR is set at 40 DTUs/ms and an input port has two high priority data flows each requiring 25 DTUs/ms, then the most that the input port can request is 40 DTUs/ms for its high priority traffic. For low priority traffic a similar logic, but with different maximums, applies. The maximum aggregate rate that low priority traffic can request is determined by the expression PCR−MCR. Thus, if PCR=100 DTUs/ms and MCR=40 DTUs/ms, then the maximum requestable rate for low priority traffic is PCR−MCR=100−40 =60 DTUs/ms. Based on this, if, for one input port, a first low priority data flow needs 30 DTUs/ms a second low priority data flow needs 25 DTUs/ms and a third low priority data flow needs 35 DTUs/ms for a total of 90 DTUs/ms, then the maximum that can be requested is 60 DTUs/ms to be distributed among the 3 low priority data flows.

Figure 4:
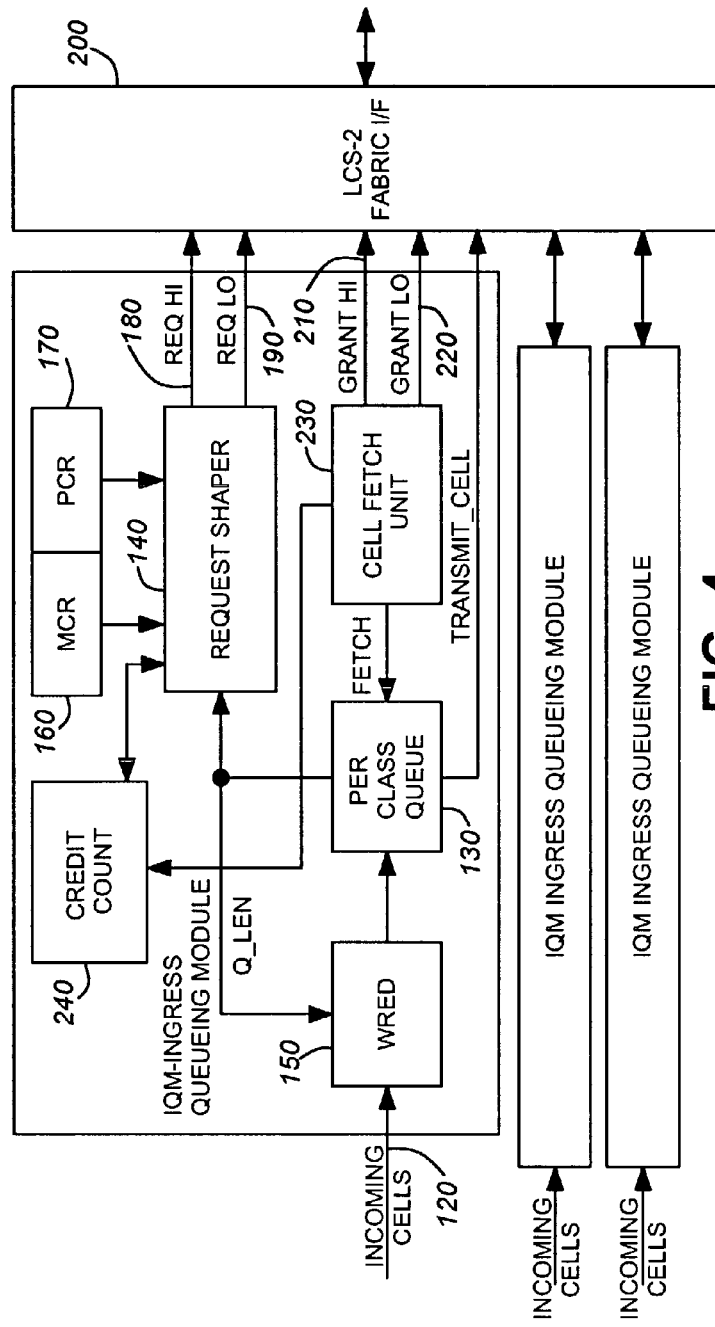
FIG. 4 is a block diagram of a module for implementing priority modulation.

Referring to FIG. 4, a block diagram of a module 110 for implementing priority modulation is illustrated. Incoming DTUs are received at an input 120 and these incoming DTUs are placed in queue 130 according to the class of the DTUs. The length of the queues 130 are transmitted to a request shaper 140 and-to an input module 150. The input module 150 regulates the acceptance and, therefore, the input flow of the incoming DTUs. While the request shaper 140 determines how much resources DTUs. The request shaper 140 determines this by determining the queue depths in the queues 130 and by determining the minimum cell rate (MCR) 160 and the peak cell rate (PCR) 170. The MCR 160 is the minimum flow rate for the system and the PCR 170 is the maximum flow rate for the system as explained above. Once the request shaper 140 determines the request levels, a request 180 for resources for high priority flows and a request 190 for resources for low priority flows is transmitted to a switch fabric 200. The switch fabric transmits the request to an exit module and relays how much of the requested resources are granted. The high priority granted resources 210 and low priority granted resources 220 are received separately by the module 110.

These resources grants are received by a DTU fetch unit 230. The DTU fetch unit 230 communicates with the queues 130 and instructs the queues 130 how many DTUs are to be transmitted for both high priority and low priority traffic. At the same time, the DTU fetch unit 230 also informs a credit unit 240 of the same information. The credit unit 240 keeps track of what is requested (by communicating with the request shaper 140) and what is granted. Once the queues 130 receive instructions on how may DTUs to release for both high and low priority traffic, these DTUs are released/transmitted to the switch fabric 200.

Feedback Priority Modulation

The feedback priority modulation module combines the principles of both the feedback rate controller and priority modulation. Essentially, feedback priority modulation applies the concept of implementing maximum data rates that can be requested while using the feedback rate controller to dynamically adjust the maximum allowable data transmission rate for each data flow/class.

To implement feedback priority modulation, the output rate is measured and transmitted to thee system input modules. Each of these system input modules, such as the module illustrate in FIG. 4, can then calculate the maximum output transmission rate that is available based on the system input module's sharing factor and the measured output rate. Thus, if a system input module's sharing factor is 0.25 and the measured output rate is 80 DTUs/ms, then the maximum output rate which the system input module can hope to achieve is 0.25×80 DTUs/ms=20 DTUs/ms. The sharing factor for an input module therefore determining how much of an output port's capacity can be utilized by that system input module. As noted above in the section dealing with the feedback rate controller, a sharing factor need not be static-it may be rendered dynamic by changing system conditions and circumstances.

One aspect of the feedback priority modulation is the seemingly static nature of the minimum transmission rate or the MCR in the previous section. While the maximum transmission rate (PCR) is mutable due to the fluctuations in the measured output rate and a possibly changing sharing factor, the MCR is set. By setting MCR to a set number, the high priority traffic is guaranteed to always achieve its minimum transmission rate as long as traffic is available. This feature of priority modulation is preserved in feedback priority modulation.

Figure 5:
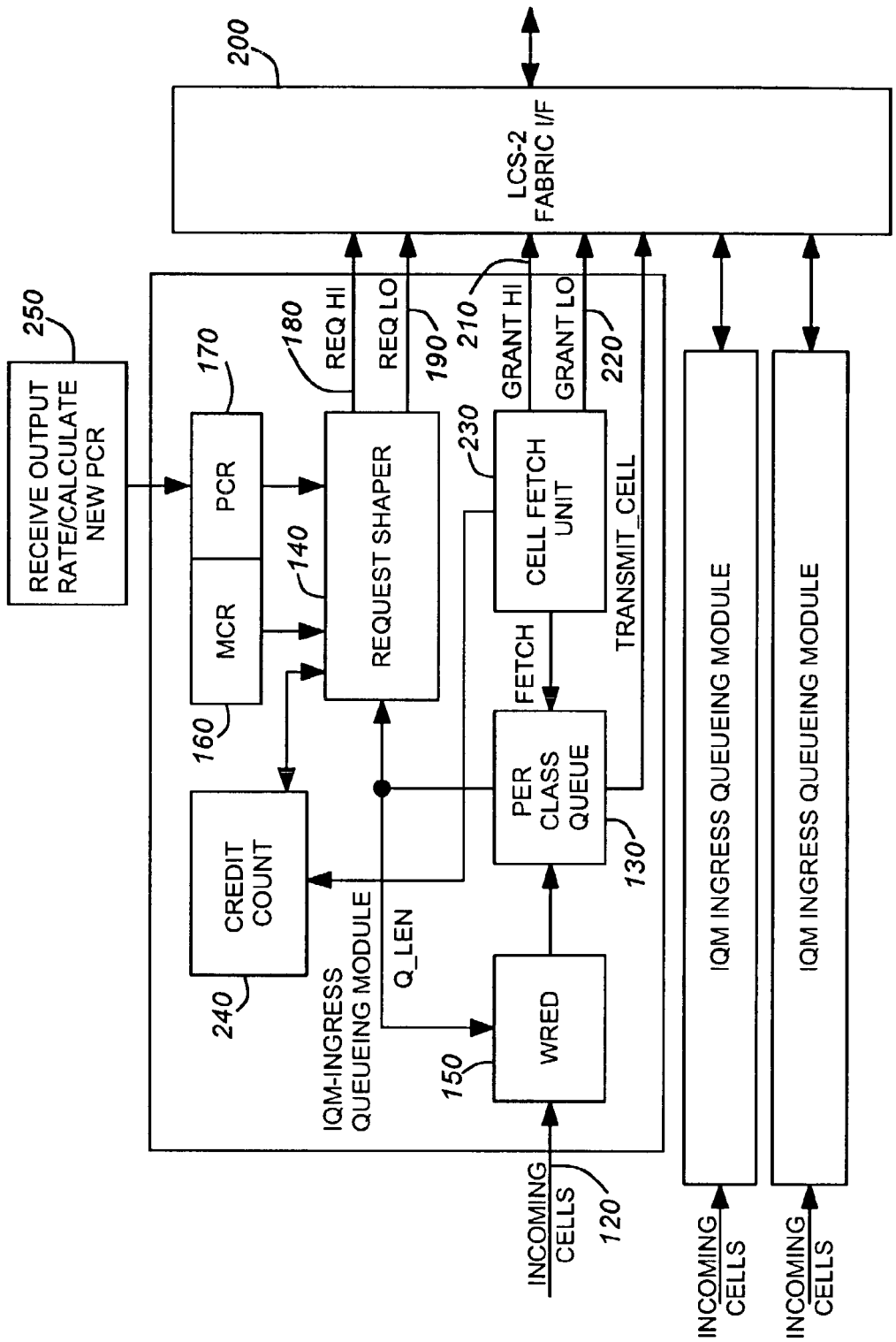
FIG. 5 is a block diagram of an implementation of feedback priority modulation.

Referring to FIG. 5, a block diagram of an implementation of feedback priority modulation is illustrated. It should be noted that the reference numbers and functions of the blocks in FIG. 5 are identical to those of FIG. 4. However, FIG. 5 differs from FIG. 4 in that a feedback/calculation block 250 is added. The feedback/calculation block receives the measured output rate from the output port or from multiple output ports. Based on these measured output rates and the sharing factor(s) for the particular system input port, the maximum transmission rate or PCR for the system input port is calculated. The calculated value is then stored in the system input module and used in determining resource requests.

Figure 6:
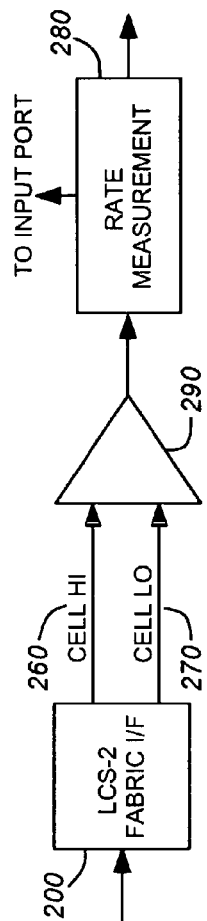
FIG. 6 is a block diagram of an example of circuitry and data flow at an output port for implementing feedback priority modulation.

Clearly, some circuitry is required at the output port to measure the output rate. FIG. 6 illustrates a block diagram of one implementation of such circuitry. The outgoing high priority traffic 260 and the outgoing low priority traffic are both measured using suitable rate measurement means 250 such as a counter. A register 290 samples the measured output rate and this sampled rate is transmitted to the system input ports.

Ideally, the output rate measurement, sampling and feedback transmission is performed at discrete time intervals with the time interval being fairly lengthy relative to the transmission time for a DTU. The assumption for this is that the traffic profile for a flow/class is fairly static and, if the profile changes, such changes occur slowly over time. Thus, if the transmission time per DTU is measured in single digit milliseconds, then any change in the traffic profile is expected to occur over hundreds of milliseconds. As such the time interval between rate measurement can be set to a value in the order of tens of milliseconds, if not hundreds of milliseconds.

Figures 7, 8:
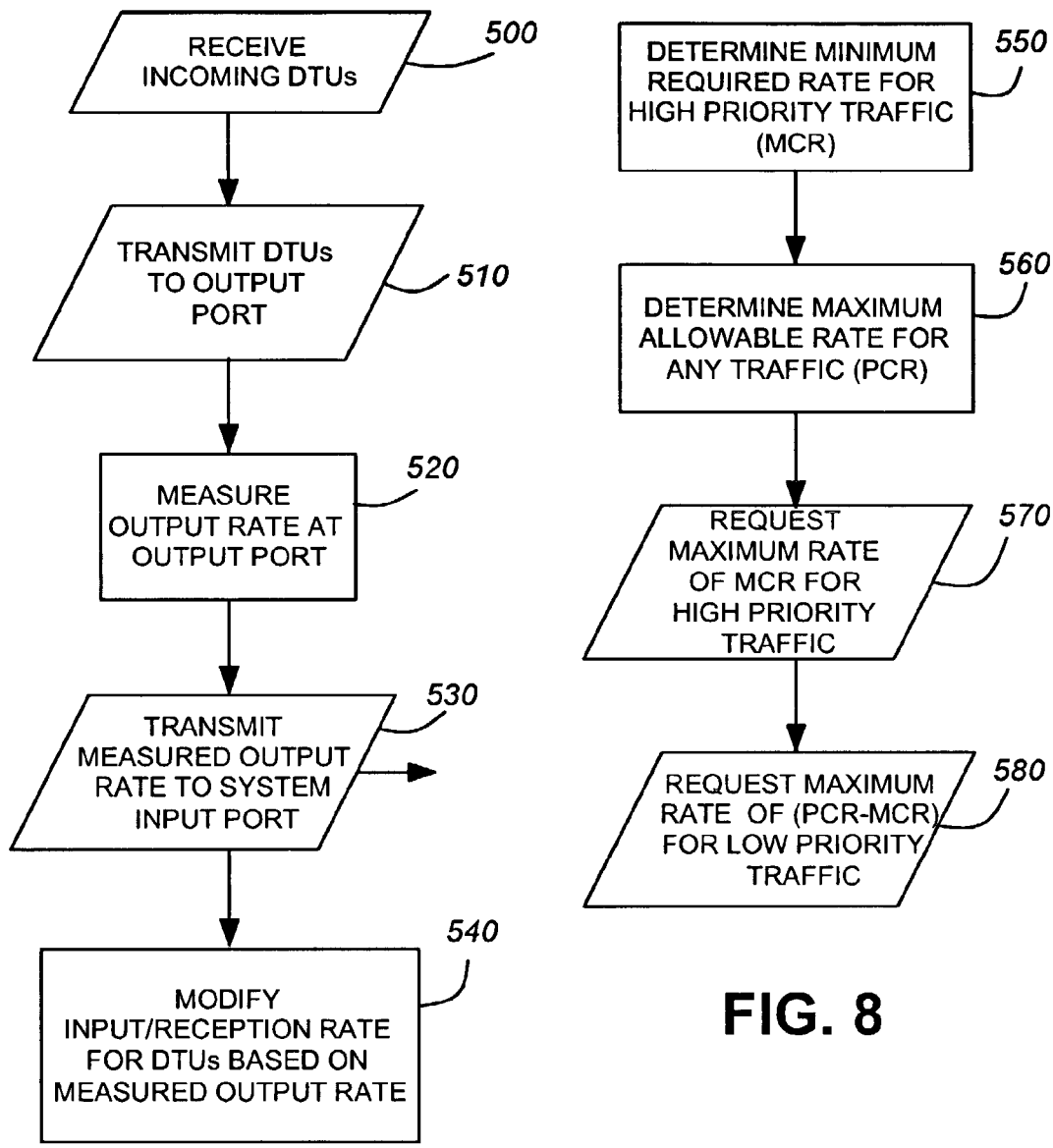
FIG. 7 is a flowchart detailing the steps executed in implementing a feedback rate controller.
FIG. 8 is a flowchart detailing the steps executed in implementing priority modulation.
Figure 9:
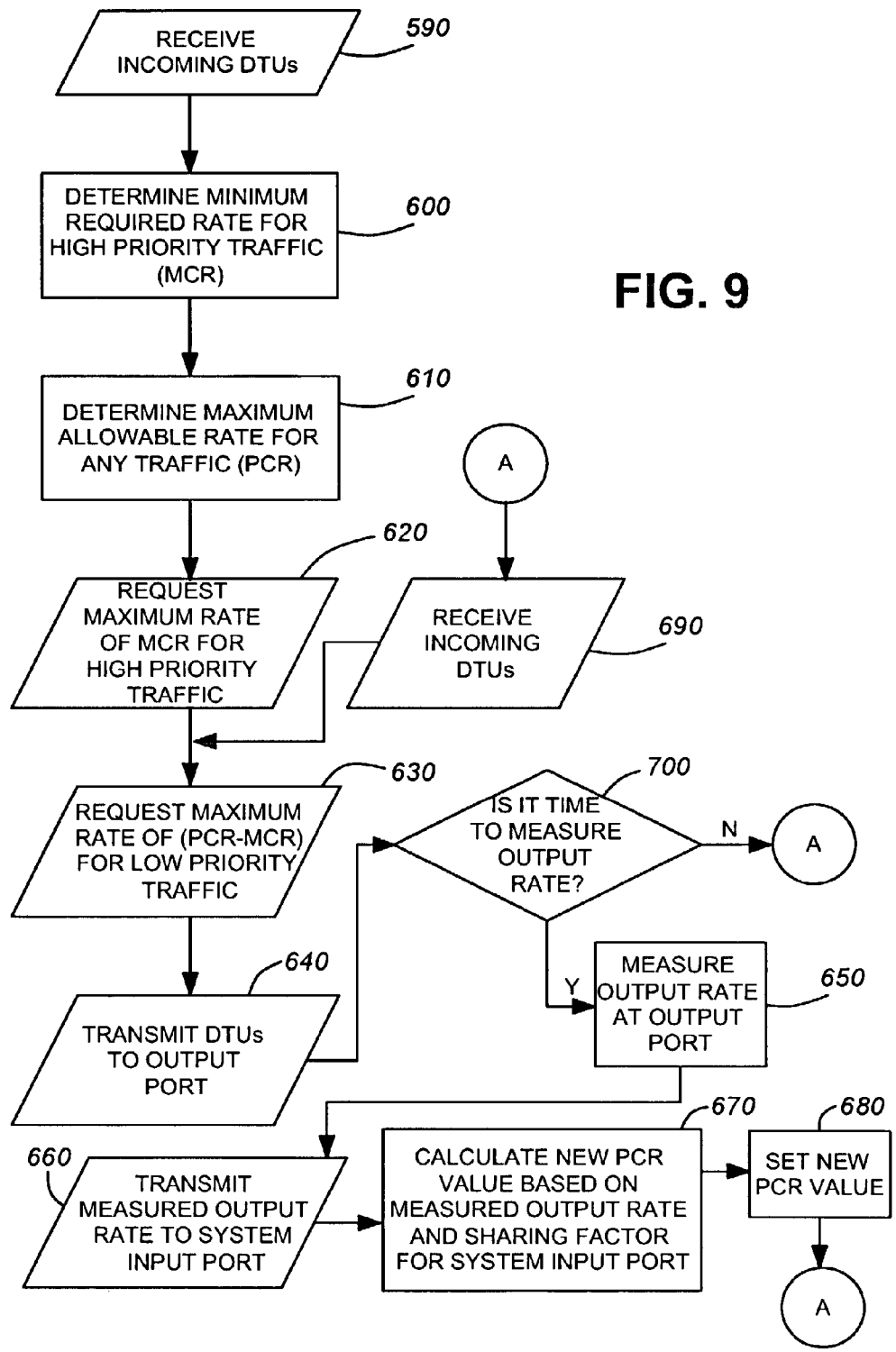
FIG. 9 is a flowchart detailing the steps executed in implementing feedback priority modulation.

Referring to FIGS. 7, 8, and 9, these figures are provided to assist in the understanding of the invention and in the different processes outlined above. FIGS. 7, 8, and 9 are flow charts for the feedback rate controller, priority modulation, and feedback priority modulation respectively.

Referring to FIG. 7, a flow chart detailing the steps for the feedback rate controller discussed above is illustrated. The process begins with step 500, that of receiving incoming DTUs at the system input module. Step 510 transmits the received DTUs to an output port, and step 520 measures the output rate at the output port. Step 530 transmits the measured output rate to the system input port. The final step in this process is step 540. In this step the input/reception rate for DTUs at the system input port is modified based on the received measured output rate. While the flowchart details modifying the input/reception rate for DTUs based merely on the measured output rate, it should be clear that, from the description above, other factors may be taken into account, when modifying the input/reception rate. Such factors can include the measured output rate for multiple output ports, specific sharing factors for specific input ports, and any prevailing conditions in the system.

Referring to FIG. 8, a flow chart detailing the steps involved in priority modulation is illustrated. The first step in this process is step 550—determining a minimum required rate for high priority traffic (MCR). The minimum required rate for high priority traffic is the minimum transmission rate that high priority traffic should receive when being output from the system. Step 560 determines the maximum allowable rate for any traffic (PCR). The maximum allowable rate is the maximum rate that any traffic, either high priority or low priority, should receive when being output from the system. Step 570 requests a rate of MCR as the maximum rate that can be requested for high priority traffic. By providing a cap to the maximum rate that can be requested for high priority traffic, any high priority traffic as will be guaranteed the rate of MCR. As long as the high priority traffic has enough traffic to provide the rate of MCR, high priority traffic will be given the rate of MCR. However, this does not mean that the maximum rate that the high priority traffic can receive equates to a rate of MCR. It should be noted that the maximum MCR rate only applies to the rate that can be requested for high priority traffic. As an example, if MCR is equal to 80 DTUs per ms, and a high priority traffic has enough to provide 100 DTUs /ms, then high priority traffic can only request up to 80 DTUs per ms. However, if there is extra transmission capacity available to the system, this extra transmission capacity can be allocated to the high priority traffic such that the effective transmission rate for high priority traffic becomes 100 DTUs per ms. The final step in this process is step 580. In this step a maximum of (PCR−MCR) rate is requested for low priority traffic. Essentially, what this step does is to provide a cap as to the maximum rate that can-be requested for a low priority traffic. Assuming that MCR is not equal to zero, low priority traffic can never request as much as a rate equal to PCR for itself. The maximum that low priority traffic can therefore request is PCR−MCR. However, as with high priority traffic, the cap on the maximum requestable rate for low priority traffic does not mean that low priority traffic cannot achieve rates higher than PCR−MCR. Essentially, low priority traffic can be granted a maximum of PCR−MCR rate based on its request but, further transmission capacity can also be had if it is available and if the traffic is available. Thus if PCR is equal to 100 DTUs per ms and MCR is equal to 30 DTUs per ms, then low priority traffic can only request a maximum rate of 70 DTUs per ms. Again, as explained above, this does not mean that a transmission rate of greater than 70 ms cannot be provided to low priority traffic. What this means is that the maximum transmission rate low priority traffic can request is 70 DTUs per ms. If the extra transmission capacity is available and if the enough low priority traffic is available then transmission rates greater than 70 DTUs per ms can be provided to the low priority traffic.

Referring to FIG. 9 a flow chart detailing the steps in implementing feedback priority modulation is illustrated. As can be seen, the steps in FIG. 9 are merely a combination of the steps illustrated in FIGS. 7 and 8. The process for FIG. 9 begins with step 590 receiving incoming DTUs at a system input module. Step 600 is determining a minimum required rate for high priority traffic or MCR. Step 610 is determining the maximum allowable rate for any traffic or what is referred to as PCR in FIG. 8 above. Step 620 then requests a maximum rate of MCR for high priority traffic while step 630 is requesting a maximum of (PCR−MCR) rate for low priority traffic. As can be seen, step 600–630 are merely reiterations of the steps in FIG. 8.

The next step in the process outlined above is step 640. In this step, the DTUs which were received in step 590 are transmitted to the output port for eventual transmission to their final destination. Step 650 is measuring the output rate at the output port and step 660 is of transmitting the measured output rate to the system input port. As can be seen, step 640–660 are reiterations of some of the steps illustrated in FIG. 7 and explained above. However, the next step, step 670, is calculating a new PCR based on the measured output rate and any sharing factor for the system input port. It is in step 670 that the steps in FIG. 9 essentially differ from the steps in FIG. 7. In FIG. 7, the input or the reception rate for the DTUs is modified based on the measured output rate whereas in step 670 of FIG. 9, it is the PCR value is modified. Step 680 is that of setting the new PCR value that was calculated in step 670. After step 680, connector A illustrates that the flow is transferred to step 690-again receiving incoming DTUs. After re-executing step 630 and 640, the flow then transfers to step 700 which determines whether it is time to measure the output rate. If it is not yet time to measure the output rate, then connector A notes that the flow returns to step 690 and that of receiving incoming DTUs. As can be seen, steps 690, 630, 640, and 700 comprise a loop that executes until it is time to once again measure the output rate. As noted above, the output rate and any changes to the PCR are to be executed at discrete time intervals. At the end of such a time interval, the logic flow of the process breaks out of step 700 and is transferred to step 650. This step measures the output rate of the output port. From step 650 to step 680, any perturbations or changes in the system may be taken into account by changes in the value of PCR. As such, steps 650–680 are only executed at discrete time intervals. At any other time, steps 690, 630, 640 and 700 execute to receive the incoming DTUs and transmit then to the output port. It should be noted that steps 590, 600, 610, and 620 are merely set up steps executed when the system is initialized.

As can be seen, the steps in FIG. 9 differ from FIG. 7 and 8 in that, in FIG. 7 the input/reception rates for DTUs is modified at the end of re-measuring of the output rate. In FIG. 9, it is not the input or reception rate that is amended or modified but rather it is the maximum output rate that is modified. Furthermore, the new PCR in step 670 of FIG. 9 is calculated based on the measured output rate and any sharing factors for the input port. This new PCR is then set for the next round of incoming DTUs until the specified time interval elapses.

The systems outlined and discussed above can be implemented using a combination of both hardware and software. Specific hardware devices may be tasked with any of the specific steps outlined above. Some of the steps above can be implemented using a general purpose central processing unit with appropriate software. Examples of what may be implemented in software include, the calculations of the new input/reception rates for DTUs for the feedback rate controller and the calculation of the new value for PCR based on measured output rate and the sharing factor for the feedback priority modulation. It should also be noted that the concepts illustrated for the feedback rate controller may be applied to an implementation of the feedback priority modulation. Specifically, the concept of using a token that is sequentially distributed to different line cards to distribute the output rate of different output ports may also be implemented in conjunction with feedback priority modulation.

A person understanding the above-described invention may now conceive of alternative designs, using the principles described herein. All such designs which fall within the scope of the claims appended hereto are considered to be part of the present invention.

We claim:

1. A method of controlling how many data transmission units (DTUs) are processed by a device, the device processing both high priority DTUs and low priority DTUs, the method comprising: a) establishing a desired minimum number of DTUs processed in a given time interval (MCR); b) establishing a desired maximum number of DTUs processed in the given time interval (PCR); c) for high priority DTUs, requesting a maximum of MCR DTUs for processing for every specific interval of time; d) for low priority DTUs, requesting a maximum of (PCR−MCR) DTUs for processing for every specific interval of time; e) determining at an output stage of the device a number of DTUs output by the device in a given amount of time; f) transmitting the number determined in step e) to an input stage of the device; and g) changing a value of PCR based on the number determined in step e).

2. A method as in claim 1 wherein step f) is executed by distributing a token among multiple input stages, the token containing data related to measured processing capacity the devices.

3. A method as in claim 1 wherein the processing executed by the device is transmitting DTUs from the input stage to the output stage.

4. A method as in claim 1 wherein the value of PCR is also based on a specific predetermined sharing factor.

5. A method as in claim 1 wherein step e) is repeated for multiple output stages.

6. A method as in claim 5 wherein step f) is executed by distributing a token among multiple input stages, the token containing data related to the number of DTUs output by the multiple output stages.

7. A method as in claim 2 wherein the taken is distributed among the multiple input stages using a highest priority protocol.

8. A method as in claim 7 wherein the token is distributed among the multiple input stages using a highest priority protocol.

9. A device for routing data transmission units (DTUs) from a source to a destination comprising: at least one input port for receiving incoming DTUs from the source; at least one output port for transmitting DTUs to the destination; a switch fabric for switching transmitting DTUs from one of the at least one input port to one of the at least one output port; a controller for controlling an input rate of the in put port and for controlling an output rate of the output port; measurement means for measuring the output rate of the output port, the measurement means transmitting the output rate to the controller, wherein the controller adjusts the input rate based on the output rate.

10. A device as in claim 9 wherein the controller further controls how much transmission capacity of the at least one output port is allocated to data flow from any on the at least one input port.

11. A device as in claim 10 wherein the controller calculates and allocates output transmission capacity on the at least one output port between the at least one input port based on how much output transmission capacity is requested by any one of the at least one input port.

12. A method of allocating resource units between high priority tasks and low priority tasks, the method comprising: a) establishing a desired minimum number of resource units (x) to be allocated to a task; b) establishing a desired maximum number of resource units (y) to be allocated to a task; c) establishing a first upper limit to resource units to be requested for high priority tasks, the first upper limit being equal to the desired minimum number of resource units (x); and d) establishing a second upper limit to resource units to be requested for low priority tasks, the second upper limit being equal to the desired maximum number of resource units (y).

13. A method as in claim 12 wherein the resource unite are output data transmission rates.

14. A method as in claim 12 wherein the tasks are transmitting data transmission units (DTUs) from a source to a destination.

15. A method as in claim 12 wherein the desired maximum number of resource units (x) is periodically changed based on a measured indication relating to how many resource units are actually used in performing tasks.

16. A method as in claim 15 wherein the resource units are output data transmission rates.

17. A method as in claim 16 wherein the tasks are transmitting data transmission units (DTUs) from a source to a destination.

* * * * *